(12) United States Patent
Young

(10) Patent No.: US 6,454,143 B1
(45) Date of Patent: Sep. 24, 2002

(54) APPARATUS AND METHOD FOR DISPENSING PARTICLES

(76) Inventor: Randy C. Young, 201 Bridgecreek Dr., Myrtle Beach, SC (US) 29588

( * ) Notice: Subject to any disclaimer, the term of this patent is extended or adjusted under 35 U.S.C. 154(b) by 0 days.

(21) Appl. No.: 10/061,535

(22) Filed: Feb. 1, 2002

(51) Int. Cl.$^7$ ............................................. B65D 47/00
(52) U.S. Cl. ...................................... 222/565; 222/412
(58) Field of Search ................................ 222/565, 412, 222/608, 391

(56) References Cited

U.S. PATENT DOCUMENTS

| | | | |
|---|---|---|---|
| 19,798 A | 3/1858 | Slevin | |
| 404,914 A | 6/1889 | Knoche | |
| 2,305,128 A | 12/1942 | Andersen et al. | 74/42 |
| 2,308,101 A | 1/1943 | Paul | 74/143 |
| 2,573,784 A | 11/1951 | Asbury | 275/8 |
| 3,058,628 A | * 10/1962 | Smith | 222/565 |
| 3,359,710 A | 12/1967 | Anderson | 56/25.4 |
| 4,341,035 A | 7/1982 | Jaworski et al. | 46/135 R |
| 5,427,283 A | * 6/1995 | Whittaker et al. | 222/565 |
| 5,746,355 A | * 5/1998 | Wold | 222/565 |

FOREIGN PATENT DOCUMENTS

RU 1499021 8/1989

* cited by examiner

*Primary Examiner*—Lesley D. Morris
*Assistant Examiner*—Thach H. Bui
(74) *Attorney, Agent, or Firm*—Moore & Van Allen PLLC; Michael G. Johnston

(57) ABSTRACT

An apparatus for dispensing particles is provided, comprising a housing including a wall dividing the interior of the housing into an upper portion and a lower portion. The dividing wall and upper portion of the housing define a cavity within the housing for holding the particles. The dividing wall has an opening for allowing the particles to pass from the cavity to the lower potion of the housing. A rotating discharge element is disposed in the housing below and adjacent to the opening in the dividing wall and is adapted to move particles through the opening and into the lower portion, of the housing upon rotary actuation thereof. A pendulum is rotatably mounted in the lower portion of the housing. A ratchet mechanism operably links the pendulum and the rotating discharge element for rotating the discharge element and dispensing particles from the housing in response to movement of the pendulum.

20 Claims, 10 Drawing Sheets

APPARATUS AND METHOD FOR DISPENSING PARTICLES

BACKGROUND

This invention relates to an apparatus and method for dispensing particles and, more particularly, to an apparatus and method for dispensing materials in particulate form over a large area, such as pesticides, insecticides, fungicides, grass seed, and fertilizers on lawns.

In the maintenance of lawns, it is sometimes desirable to apply pesticides, insecticides or fungicides to the lawn, or to spread fertilizer or seed over the soil. When the material being distributed is in particulate form, such as pellets or powder, the necessary equipment often involves special distribution or spreading mechanisms. Such mechanisms include broadcast spreaders for distributing a high volume of seed, fertilizer, weed killer, and the like, over a wide area. However, some applications do not require high volume or high area distribution. For example, with some insecticides and pesticides, a small amount spaced over a wide area is all that it is necessary.

Therefore, it is sometimes desirable to replace the dedicated mechanisms used in high volume, high area distribution.

For the foregoing reasons, there is a need for a new apparatus and method for distributing a relatively small number of particles over a wide area. The new apparatus and method should be particularly adapted for use in lawn maintenance.

SUMMARY

According to the present invention, an apparatus for dispensing particles is provided, comprising a housing including a wall dividing the interior of the housing into an upper portion and a lower portion. The dividing wall and upper portion of the housing define a cavity within the housing for holding the particles. The dividing wall has an opening for allowing the particles to pass from the cavity to the lower potion of the housing. A rotating discharge element is disposed in the housing below and adjacent to the opening in the dividing wall and is adapted to move particles through the opening and into the lower portion of the housing upon rotary actuation thereof. A pendulum is rotatably mounted in the lower portion of the housing. A ratchet mechanism operably links the pendulum and the rotating discharge element for rotating the discharge element and dispensing particles from the housing in response to movement of the pendulum.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGS. It is understood that the components may be oriented in any direction and the terminology, therefore, should be understood as encompassing such variations unless specified otherwise.

Figure 1:
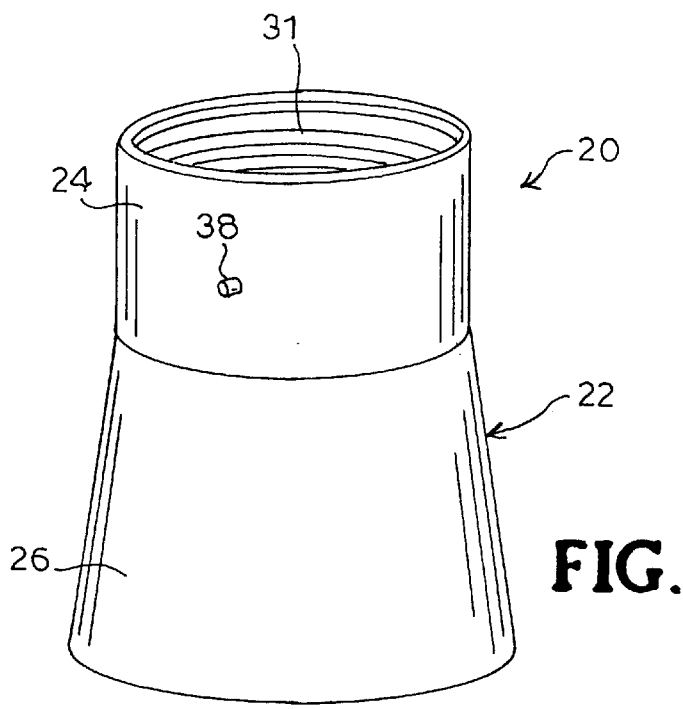
FIG. 1 is a perspective view of an embodiment of an apparatus for dispensing particles according to the present invention.

Referring now to the drawings, wherein like reference numerals designate corresponding or similar elements throughout the several views, FIG. 1 shows an apparatus, generally designated at 20, for dispensing materials in particulate form. The apparatus 20 includes a housing 22 having an upper portion 24 and a lower portion 26. As seen in FIG. 1, the housing 20 is generally "bell-shaped", with the lower portion 26 having a larger diameter than the upper portion 24. However, it is understood that the housing 20 may have any convenient shape.

Figure 2:
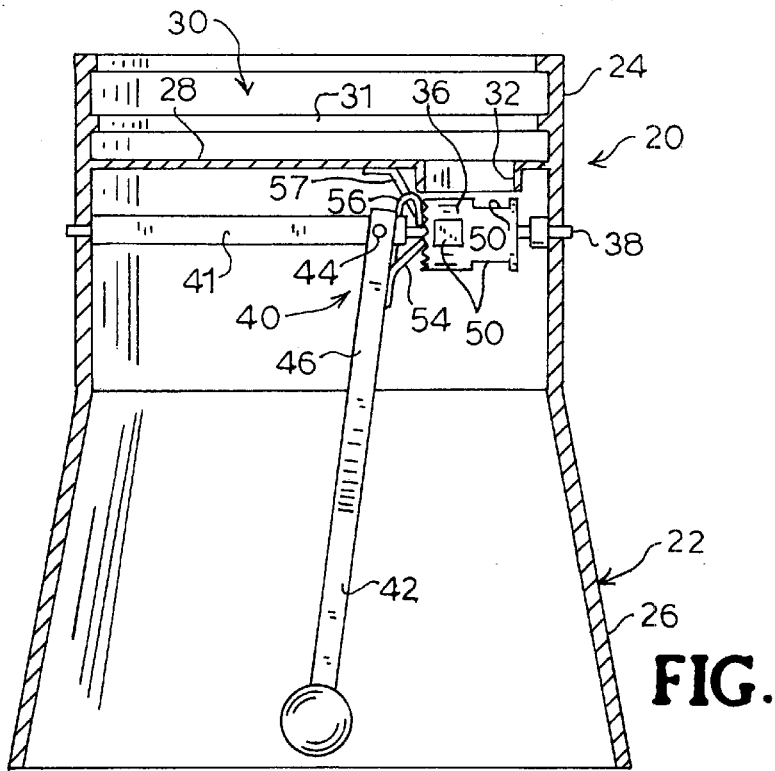
FIG. 2 is an elevated cross-section of the particle dispensing apparatus shown in FIG. 1.

Referring to FIG. 2, a horizontal wall 28 spans the interior of the housing 22 dividing the upper portion 24 from the lower portion 26. The upper surface of the dividing wall 28 and the walls of the upper portion 24 of the housing 22 define a hopper 30 for holding particles to be dispensed. The top portion 24 of the housing 22 may be internally threaded 31 for connection to a source of particles (not shown) to be dispensed. An opening 32 is formed in the dividing wall 28 for allowing particles to pass from the hopper 30 to the lower portion 26 of the housing 22. As seen in FIG. 2, the lower portion 26 of the housing 22 is open.

Figure 3:
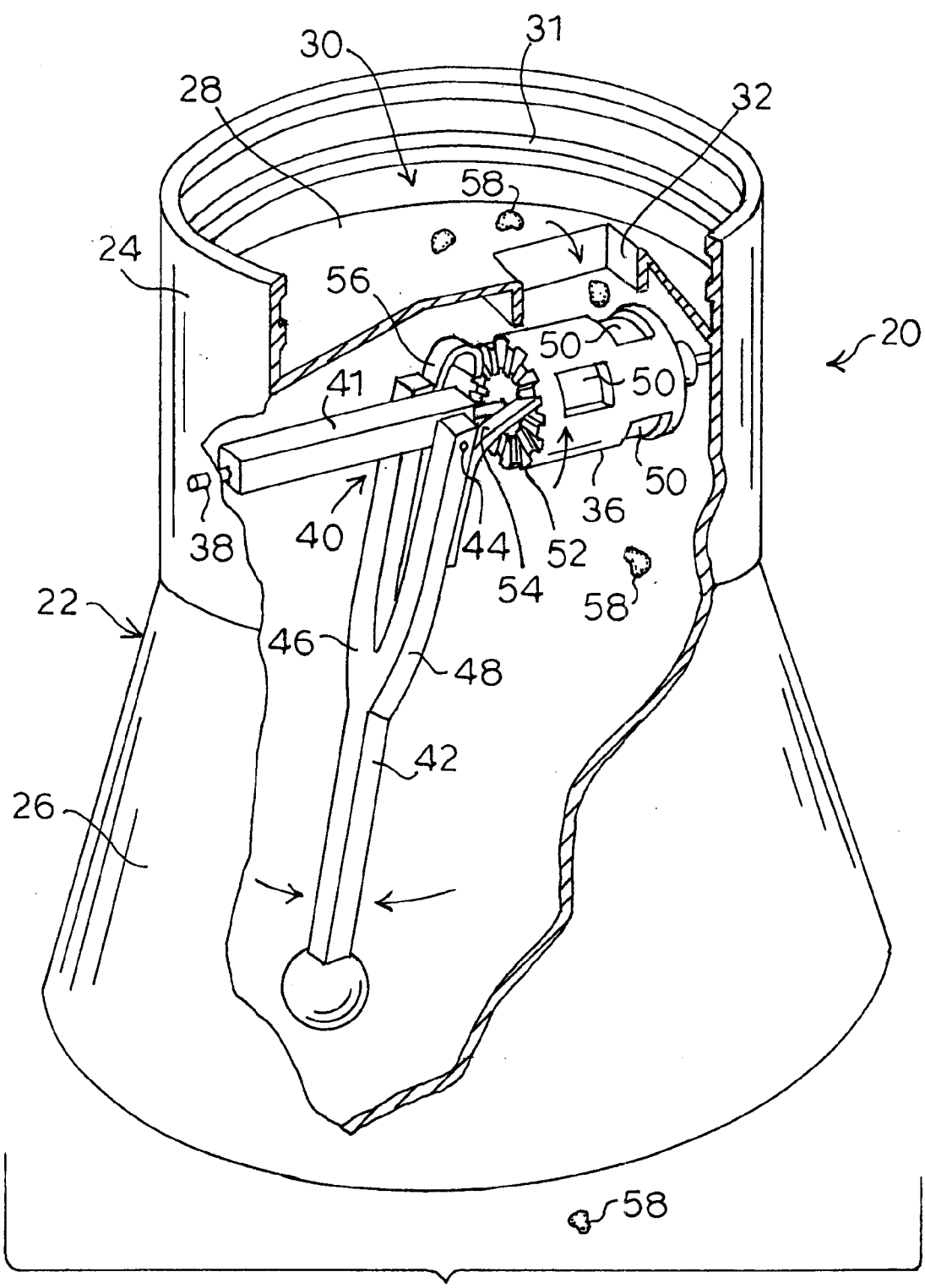
FIG. 3 is a perspective view, partially broken away, of the particle dispensing apparatus shown in FIG. 1.

The housing 22 accommodates a pendulum mechanism 34 and a rotary discharge element 36. The pendulum mechanism 34 comprises a pendulum shaft 38 and a pendulum 40 including a sleeve 41 and a rigid body 42 depending from the sleeve 41. The pendulum shaft 38 spans the interior of the lower portion 26 of the housing 22 below the dividing wall 28. The ends of the pendulum shaft 38 are journaled in the walls of the housing 22. Referring to FIG. 3, the pendulum sleeve 41 has an axial opening for rotatably receiving the shaft 38. Opposed pins 44 extend transversely from the sleeve 41. The rigid body 42 is forked at one end, each of the arms 46, 48 of the rigid body 42 having openings for pivotally receiving the pins 44 on the sleeve 41 so that the rigid body 42 can swing freely in a plane including the longitudinal axis of the pendulum shaft 38.

The rotary discharge element 36 comprises a substantially cylindrical block having holes 50 spaced throughout its periphery. The discharge element 36 has an axial opening for rotatably receiving the pendulum shaft 38 and is positioned on the pendulum shaft 38 such that an end wall of the discharge element 36 is adjacent the upper end of the pendulum's rigid body 42. As best seen in FIG. 3, teeth 52 are formed in the edge of the end wall of the discharge element 36. Driving pawls 54, 56 are mounted on the arms 46, 48 of the body 42 and engage the teeth 52 on the discharge element 36. A holding pawl 57 secured to the dividing wall 28 extends downwardly from the dividing wall 28 and engages the teeth 52 to allow rotation of the rotary discharge element 36 in only one direction.

In operation, the hopper 30 is at least partially filled with a solid material in particulate form. Only a few particles 58 are shown in FIG. 3 so as not to unnecessarily complicate the drawing for the purpose of this description. Movement of the housing 22 causes the pendulum 40 to oscillate. Movement of the pendulum 40 is transmitted to the discharge element 36. Specifically, as the pendulum 40 swings to the right, as seen in FIG. 3, the driving pawl 54 operates on the teeth 52 of the discharge element 36 for driving the rotary discharge element 36 a partial revolution in a counterclockwise direction. The other driving pawl 56 slips over the gear teeth 52. When the pendulum 40 swings in the other direction, to the left as seen in FIG. 3, the pawl 54 slips over the gear teeth 52 and the driving pawl 56 turns the rotary discharge element 36 in a counterclockwise direction. When the pendulum 40 rotates on the pendulum shaft 38 in a plane perpendicular to the shaft 38, out of the page as seen in FIG. 3, the driving pawls 54, 56 engage the teeth 52 for rotating the rotary discharge element 36 in the counterclockwise direction. As the pendulum swings back, into the page as seen in FIG. 3, the holding pawl 57 prevents the discharge element 36 from moving and the driving pawls 54, 56 slip over the teeth 52.

Together the driving pawls 54, 56, rotary discharge element 36, including the teeth 52, and holding pawl 57 comprise a ratchet mechanism which allows the discharge element 36 to rotate in only one direction under the influence of the pendulum 40 as the pendulum 40 oscillates in three of four possible directions. The result is one way intermittent rotary motion of the discharge element 36 imparted by the swinging pendulum 40.

As the discharge element 36 rotates, the holes 50 in the periphery align with the opening 32 in the dividing wall 28 of the housing 22 for receiving one or more particles 58 from the hopper 30. Continued rotation of the discharge element 36 causes the particles 58 to eventually drop from the discharge element 36 and out of the lower end of the housing 22. Thus, random pendulum 40 oscillation is converted to rotary motion for discharging particles introduced into the hopper 30.

Figure 4:
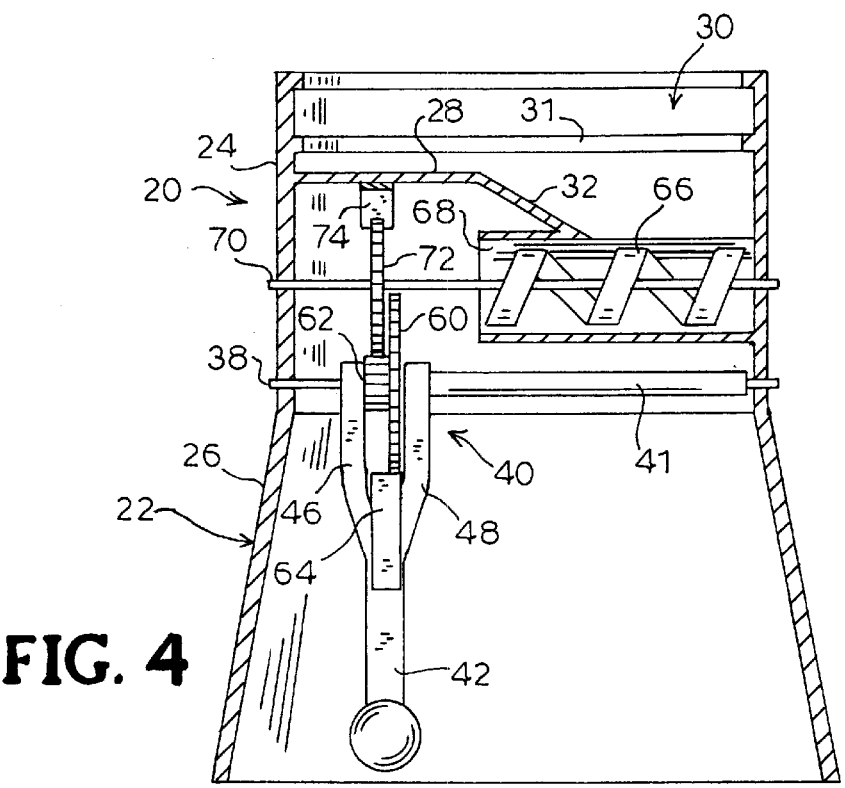
FIG. 4 is an elevated cross-section of another embodiment of a particle dispensing apparatus according to the present invention.
Figure 5:
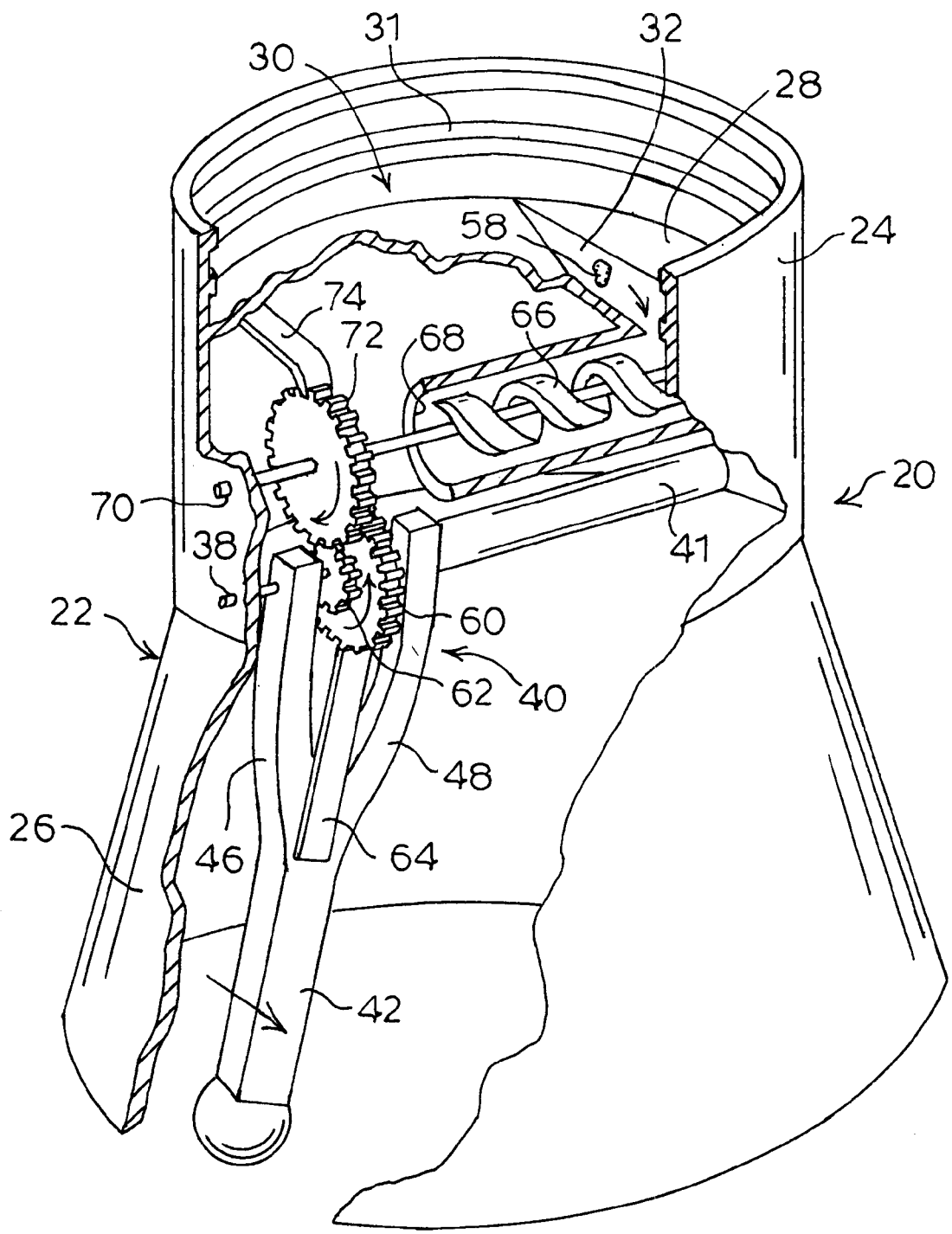
FIG. 5 is a perspective view, partially broken away, of the particle dispensing apparatus shown in FIG. 4.

Another embodiment of the apparatus 20 for dispensing solid materials according to the present invention is shown in FIGS. 4 and 5. In this embodiment, the arm 48 of the pendulum body 42 is fixed to the sleeve 41 for rotation with the sleeve 41 in a plane perpendicular to the pendulum shaft 38. A ratchet wheel 60 keyed to a pinion gear 62 are rotatably positioned on the pendulum shaft 38 between the arms 46, 48 of the pendulum 40. A driving pawl 64 extends upwardly from the intersection of the arms 46, 48 to engage the ratchet wheel 60.

A worm gear 66 is disposed in an outlet passage 68 integrally formed with the opening 32 in the dividing wall 28. The worm gear axle 70 spans the inside of the housing 22 above the pendulum shaft 38. The ends of the axle 70 are journaled in the walls of the housing 22. A driven gear 72 is keyed to the axle 70 and arranged to mesh with the pinion gear 62 on the pendulum shaft 38. A holding pawl 74 fixed to the wall of the housing 22 engages the teeth on the driven gear 72.

In this embodiment, oscillation of the pendulum 40 in one direction, out of the page as seen in FIG. 5, drives the worm gear 66. Specifically, as the pendulum 40 swings in this direction, the driving pawl 64 operates on the ratchet wheel 60 so that the pendulum 40, ratchet wheel 60 and pinion gear 62 move together thereby turning the driven gear 72 which, in turn, turns the worm gear 66. The holding pawl 74 slips over the teeth of the driven gear 72. When the pendulum 40 swings back in the other direction, into the page as seen in FIG. 5, the holding pawl 74 prevents the gear train from turning so that the driving pawl 64 on the pendulum 40 slips over the teeth on the ratchet wheel 60. The result is intermittent one-way rotary motion of the worm gear 66 when the pendulum 40 swings. As the worm gear 66 rotates, the worm gear 66 engages the particles 58 and propels the particles 58 from the hopper 30 to the end of the outlet passage 68. Particles 58 reaching the end of the outlet passage 68 drop out of the lower end of the housing 22.

It is understood for all embodiments of the present invention described herein that the rotation of the gear train by the pendulum 40 may be stepped-up or stepped-down, as desired, by selection of the gear ratios. For example, the power generated by the pendulum mechanism 34 and the worm gear 66 can be altered by changing the respective sizes of these elements as is known by one of ordinary skill in the art. This may provide some advantage wherein the power generated by the gear train is sufficient to break up large particles in the worm gear 66. In fact, the relative proportions of the pendulum, gears, pawls, ratchet wheels, and the like are without limit within the scope of the invention. Accordingly, the gear ratios shown in the FIGS. are intended to be instructive and I do not intend to limit the invention to only those ratios.

Figure 6:
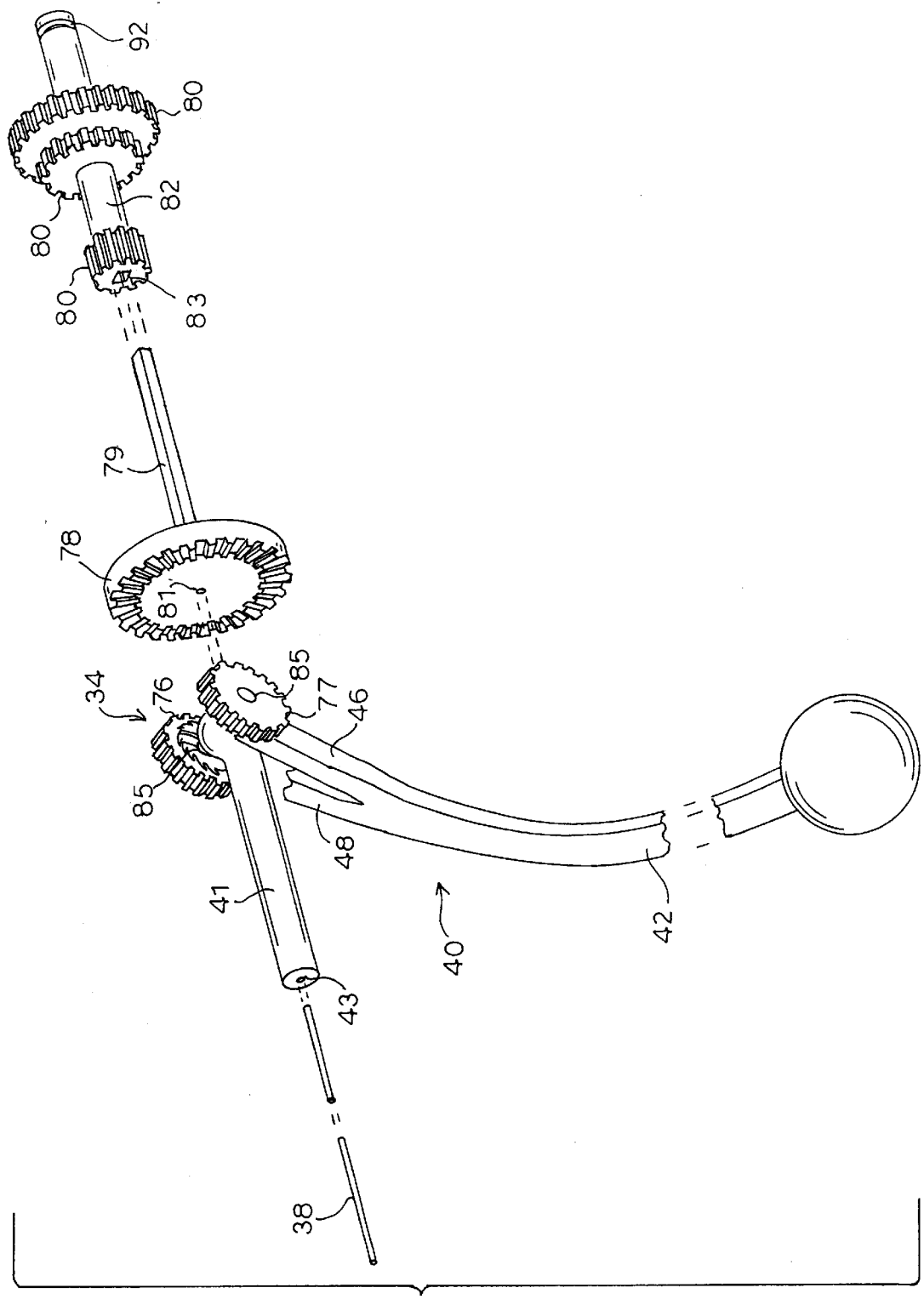
FIG. 6 is an exploded view of a pendulum mechanism and part of the gear train for use in still another embodiment of a particle dispensing apparatus according to the present invention.

A third embodiment of the apparatus 20 for dispensing solid materials according to the present invention is shown in FIGS. 6–9. The pendulum mechanism 34 for use in this embodiment is seen in FIG. 6, including the shaft 38, the pendulum 40, a large bevel gear 78 and integral shaft 79, and a drive shaft 82 comprising three spaced pinion gears 80 of varying size keyed to the drive shaft 82. The pendulum sleeve 41 and the bevel gear 78 and shaft 79 have axial openings 43, 81 for rotatably receiving the shaft 38. The bevel gear shaft 79 is non-circular, for example, square as shown in FIG. 6. The drive shaft 82 has a complementary opening 83 for slidably but non-rotatably receiving bevel gear shaft 79.

Figure 7:
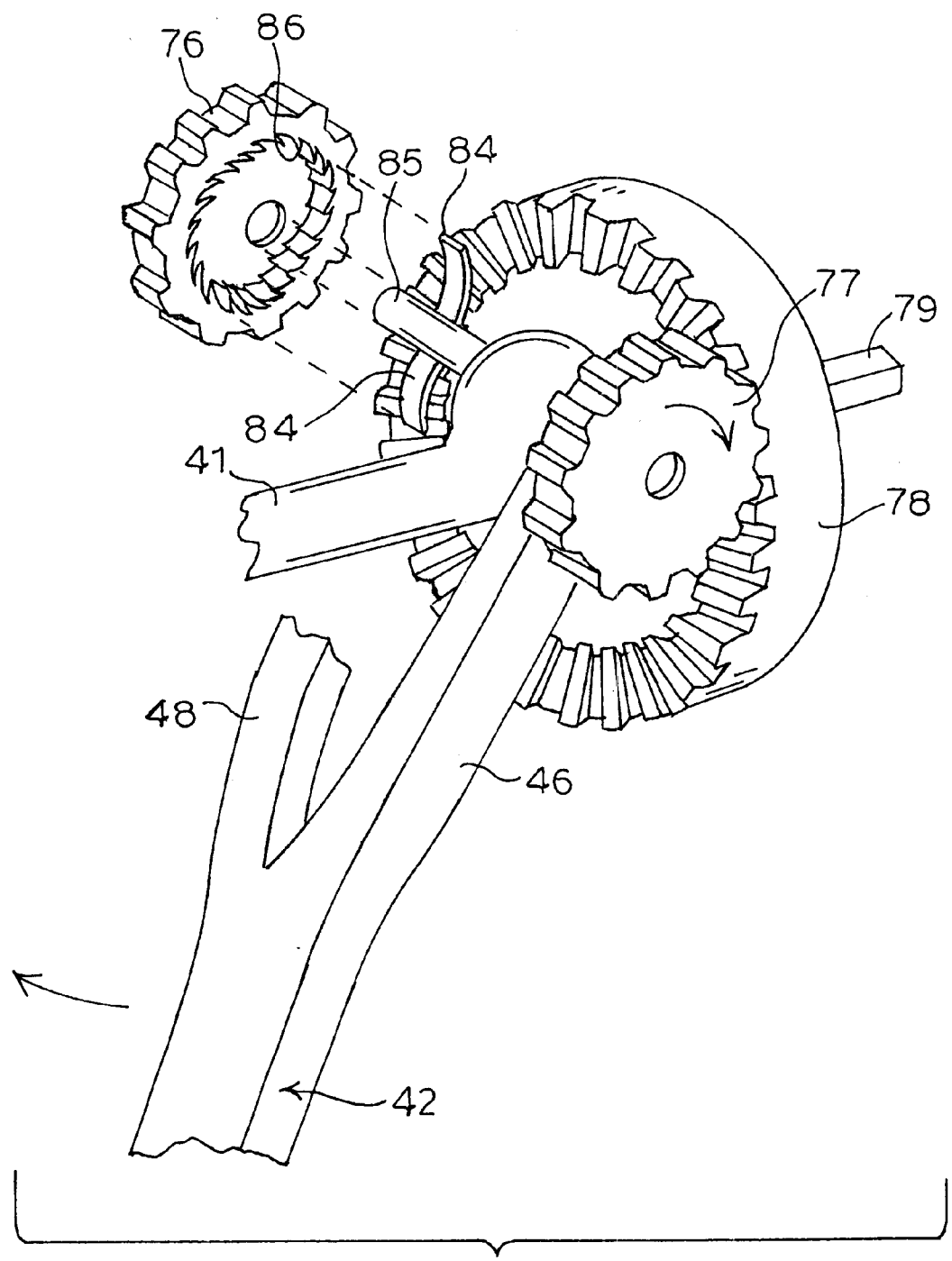
FIG. 7 is a close-up, partially exploded and broken away, perspective view of a ratchet mechanism for use in the pendulum mechanism and part of the gear train shown in FIG. 6.

As best seen in FIG. 7, a rotating pin 85 extends transversely from the pendulum sleeve 41 and is received in openings in the pendulum arms 46, 48 for rotation with the pendulum 40 in a plane including the longitudinal axis of the pendulum shaft 38. Bevel gears 76, 77 are rotatably mounted on the ends of the pin 85. Each end of the pin 85 includes opposed driving pawls 84. The pawls 84 engage ratchet teeth 86 on the inner peripheral surface of the bevel gears 76, only one of which is shown in FIG. 7, so that each bevel gear 76, 77 rotates with the movement of the pendulum 40 in only one direction which is opposite to the other bevel gear.

Figure 8:
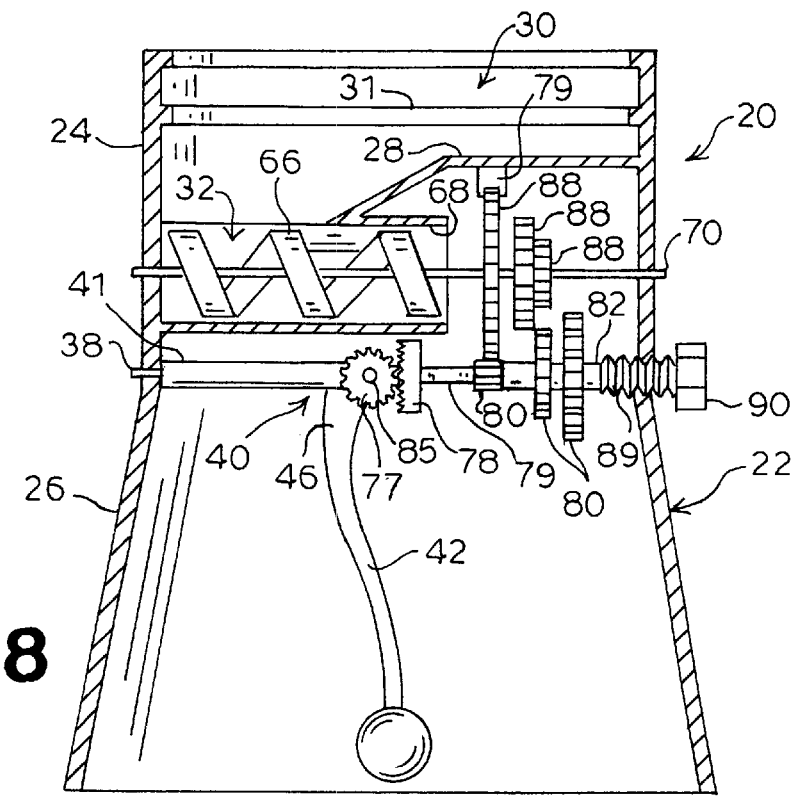
FIG. 8 is an elevated cross-section of the embodiment of the particle dispensing apparatus using the pendulum mechanism and part of the gear train shown in FIG. 6.
Figure 9:
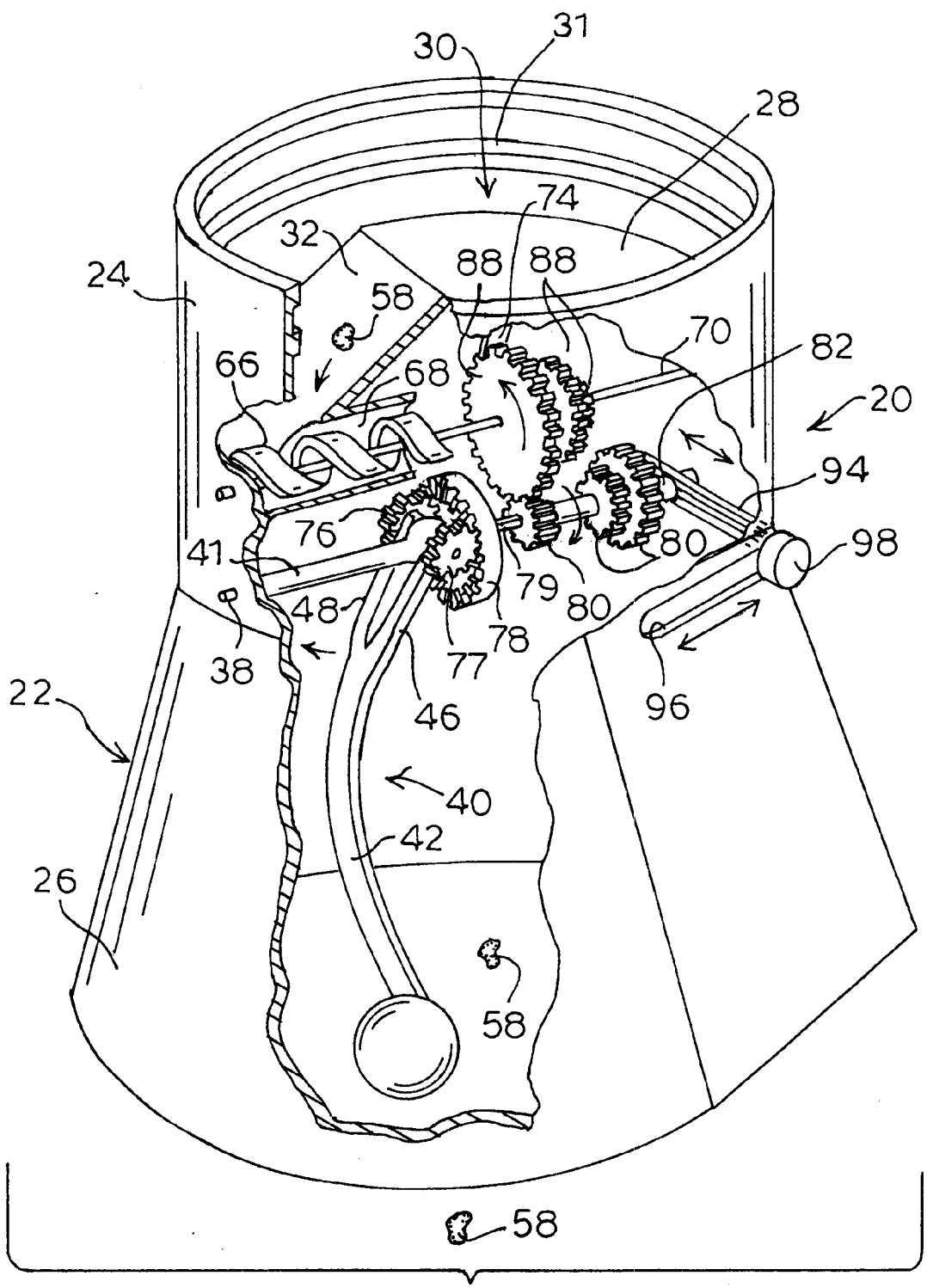
FIG. 9 is a perspective view, partially broken away, of the particle dispensing apparatus shown in FIG. 8.

The apparatus 20 of the third embodiment of the present invention is shown in FIGS. 8 and 9. When assembled, the small bevel gears 76, 77 associated with the pendulum 40 mesh with the larger bevel gear 78. The pendulum sleeve 41 and bevel gear shaft 79 extend to the inner wall of the housing 22 at opposite ends of the shaft 38 to ensure a close fit.

The worm gear axle 70 carries three spaced driven gears 88. The distance between each of the respective driven gears 88 and the corresponding pinion gears 80 is the same. The drive shaft 82 is slidable along the bevel gear shaft 79 for positioning the drive shaft 82 to align the desired one of the pinion gears 80 with the corresponding driven gear 88. Means for positioning the drive shaft 82 on the bevel gear shaft 79 is shown in FIG. 8, wherein the outer end of the drive shaft 82 is threaded 89 and extends through the wall of the housing 22. A cap 90 is provided on the outer end externally of the housing 22. Turning the cap 90 will move the drive shaft 82 along the shaft 38. Another means for selectively positioning the drive shaft 82 is shown in FIG. 9. The distal end of the drive shaft 82 has a circumferential groove 92 which is received in a slotted lever 94 projecting from an elongated opening 96 in the housing 22. A knob 98 fixed to the end of the lever 94 allows the user to move the lever 94 along the opening 96 for positioning the drive shaft 82 to appropriately align the gears 80, 88. Thus, variable gear ratios are possible. It is understood that any number of gear ratios are possible with one limitation being the size of the housing 22 necessary to accommodate multiple possible gear trains. It is also understood that a gear train including variable gear ratios could be added to any of the previously described embodiments.

The third embodiment of the present invention functions similarly to the other embodiments described above. The selected gear train connects the pendulum 40 with the worm gear 66 so that oscillation of the pendulum 40 will cause the worm gear 66 to rotate in a direction to discharge particles 58 from the hopper 30. Gears 80, 88 which are not engaged run idle.

Specifically, when the pendulum 40 swings to the right, as seen in FIGS. 6–9, the driving pawls 84 engage the teeth 86 in the small gear 76 on the pendulum pin 85 turning the small gear 76 which turns the large bevel gear 78 clockwise for driving the gear train. The driving pawls and teeth (not shown) associated with the small gear 77 on the other end of the pendulum pin 85 are arranged to ratchet during the rightward swing of the pendulum 40. When the pendulum 40 swings to the left, the driving pawls engage the teeth on the small gear 77 turning the small gear 77 which turns the bevel gear 78 clockwise for driving the gear train, while the other small gear 76 ratchets. When the pendulum 40 rotates on the pendulum shaft 38 in a plane perpendicular to the shaft 38, into the page as seen in FIG. 9, the small gears 76, 77 on the pendulum are prevented from rotating by the driving pawls 84 so that the bevel gear 78 is rotated clockwise. As the pendulum swings back, out of the page as seen in FIG. 9, the bevel gear 78 is prevented from turning by the pawl 74 engaging the largest gear 88 and the gears 76, 77 ratchet. Thus, movement of the pendulum in three of four possible directions moves the gear train and advances particles 58 from the hopper 30 and out of the lower portion 26 of the housing 22.

Figure 10A:
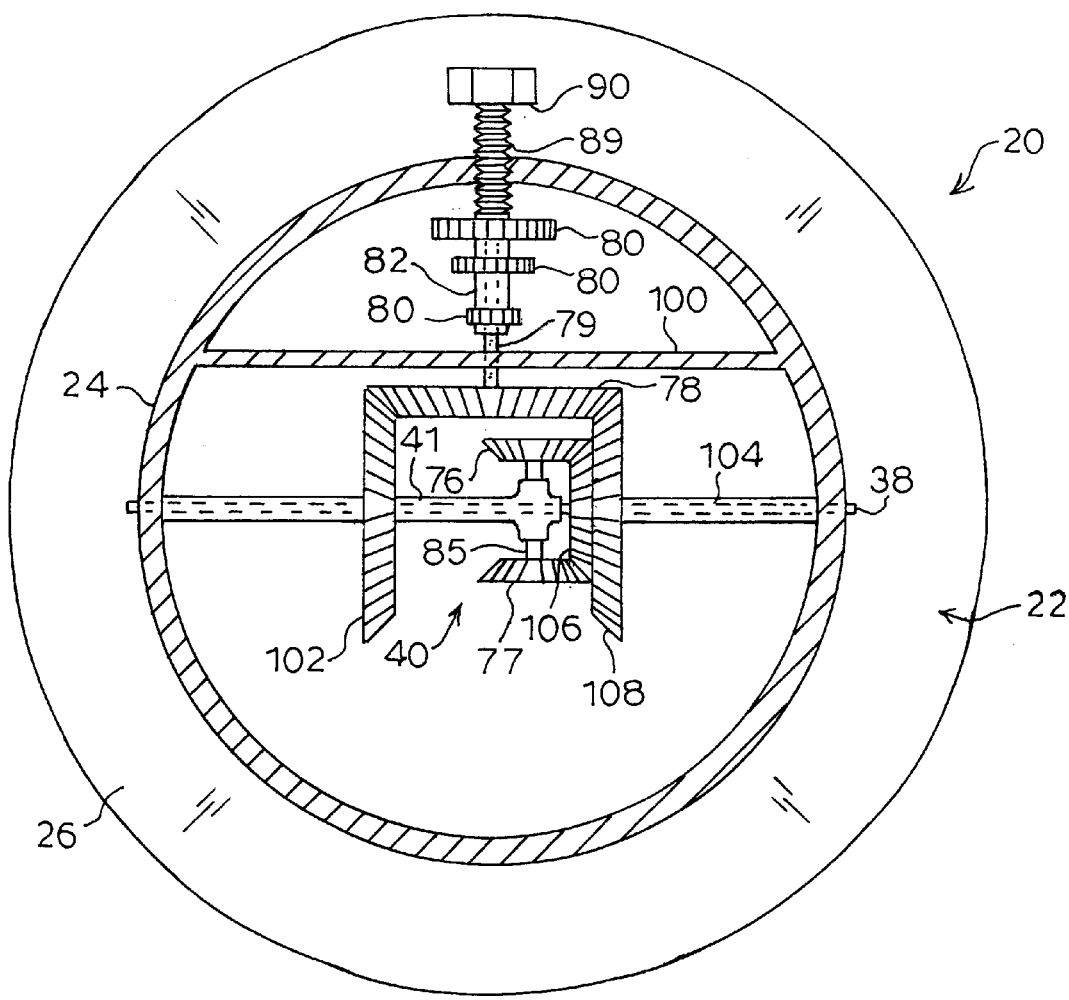
FIG. 10A is a plan cross-section of a fourth embodiment of a particle dispensing apparatus according to the present invention.
Figure 10B:
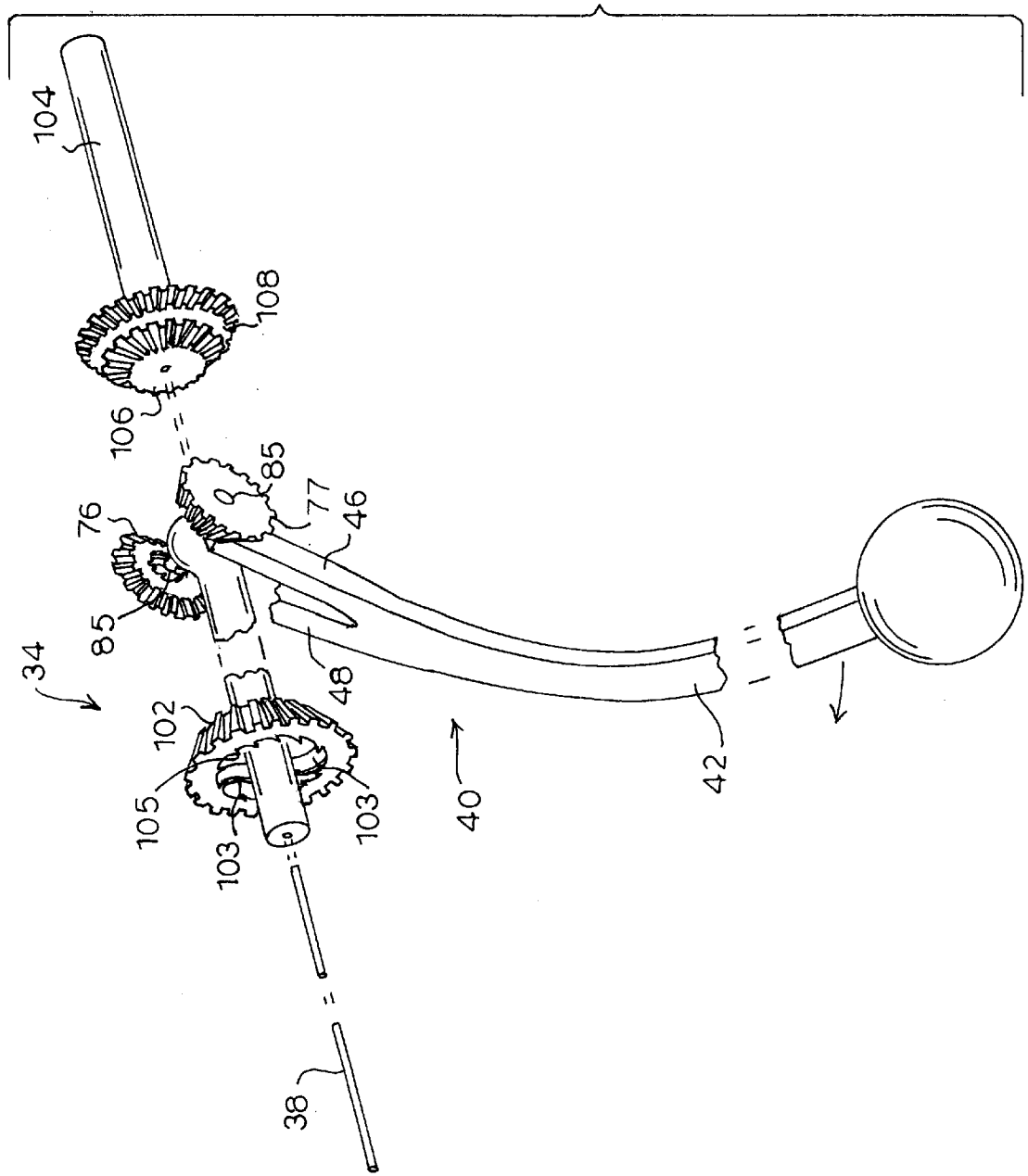
FIG. 10B is an exploded view of a pendulum mechanism and part of the gear train for use in the embodiment of the particle dispensing apparatus shown in FIG. 10A.

A fourth embodiment of the apparatus 20 according to the present invention is shown in FIGS. 10A and 10B. In this embodiment, movement of the pendulum 40 in all directions moves the gear train. As seen in FIG. 10A, a support wall 100 spans the housing 22 for rotatably supporting the bevel gear shaft 79 adjacent the bevel gear 78. The pendulum shaft 38 is mounted in the housing 22 perpendicular to the bevel gear shaft 79. The pendulum 40 (FIG. 10B), comprising the same elements as described above with respect to the third embodiment, is mounted on one end of the pendulum shaft 38. A large bevel gear 102 is rotatably mounted on the pendulum sleeve 41. The pendulum sleeve 41 includes opposed driving pawls 103 which engage ratchet teeth 105 on the inner peripheral surface of the bevel gear 102 so that the bevel gear 102 rotates with the pendulum sleeve 41 in only one direction.

A shaft 104 carrying two joined bevel gears, a smaller inner gear 106 and a larger outer gear 108, fits over the other end of the pendulum shaft 38. The large bevel gear 102 on the pendulum sleeve 41 and the large outer gear 108 mesh with the driven bevel gear 78. The pendulum sleeve 41 and the shaft 104 extend to the inner wall of the housing 22 at opposite ends of the shaft 38 to ensure a close fit. The small pendulum bevel gears 76, 77 mesh with the small inner gear 106.

The gear train of the fourth embodiment is arranged so that when the pendulum 40 swings right, as seen in FIG. 10, the small bevel gear 76 on the one end of the pendulum pin 85 turns with the pin 85 while the other gear 77 ratchets thereby turning the gears 106, 108 in a clockwise direction. The large outer gear 108 turns the driven gear 78 counterclockwise which ratchets the gear 104 on the pendulum sleeve 41. When the pendulum 40 swings left, the other small gear 77 turns with the pin 85 while the small gear 76 ratchets thereby turning the gears 106, 108. The large outer gear 108 turns the driven gear 78 counterclockwise which ratchets the pendulum sleeve gear 102. When the pendulum swings upward, as seen in FIG. 10, the small gears 76, 77 do not rotate thereby turning the two gears 106, 108 in a clockwise direction. Again, this drives the driven gear 78 in a counterclockwise direction and ratchets the pendulum sleeve gear 104. When the pendulum swings downward, the driving pawls 103 on the pendulum sleeve 41 act to turn the gear 104 with the sleeve 41 for rotating the driven bevel gear 78 in a counterclockwise direction. The driven bevel gear 78 turns the gears 106, 108 in a clockwise direction which ratchets the small gears 76, 77 on the pendulum 40. As described above with respect to the third embodiment, rotation of the driven bevel gear 78 moves the remainder of the gear train and advances particles 58 from the hopper 30 and out of the lower portion 26 of the housing 22.

In keeping with the invention, the apparatus 20 of the present invention is adapted for being mounted to a moving device to induce movement of the pendulum 40. In one particular application, the moving object is a tractor 90 (FIG. 11) or a lawn mower 92 (FIG. 12) for dispensing particles on the ground when either of these exemplary devices are used in combination with the present invention.

Figure 11:
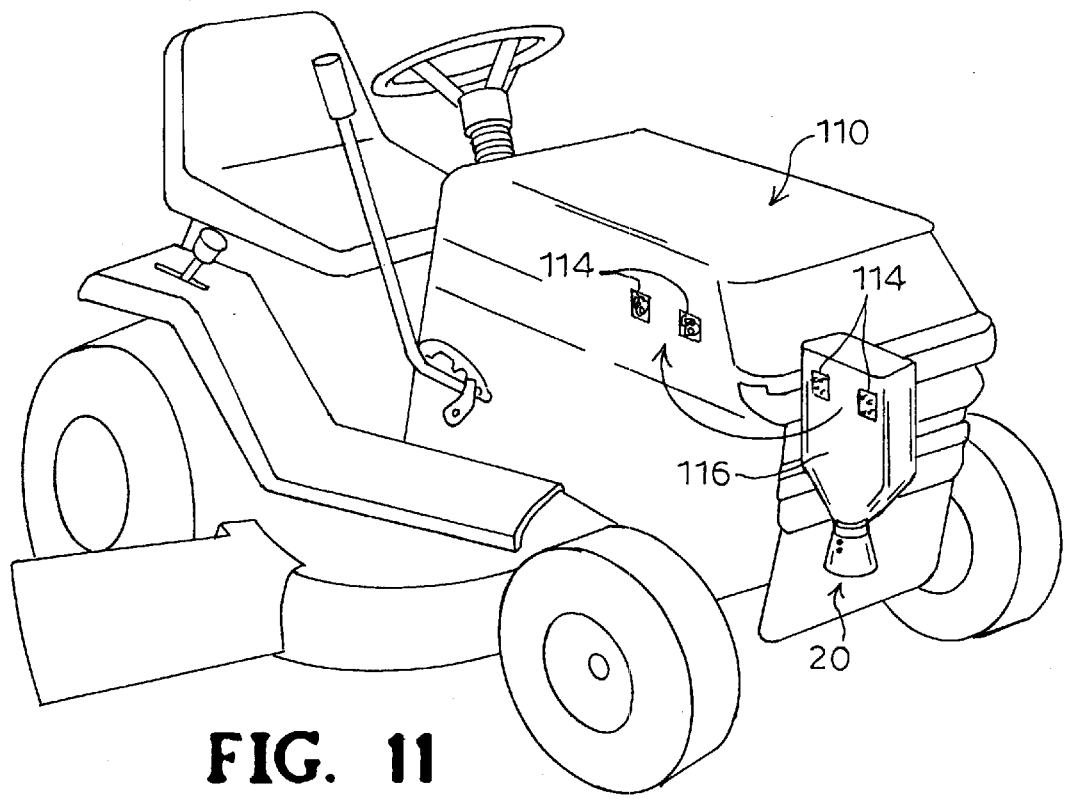
FIG. 11 is a perspective view of a tractor including means for mounting an embodiment of a particle dispensing apparatus according to the present invention.
Figure 13:
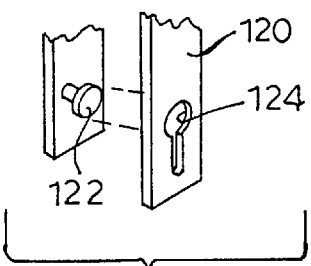
FIG. 13 is a partial perspective view of another means for mounting the particle dispensing apparatus to the lawn mower.
Figure 12:
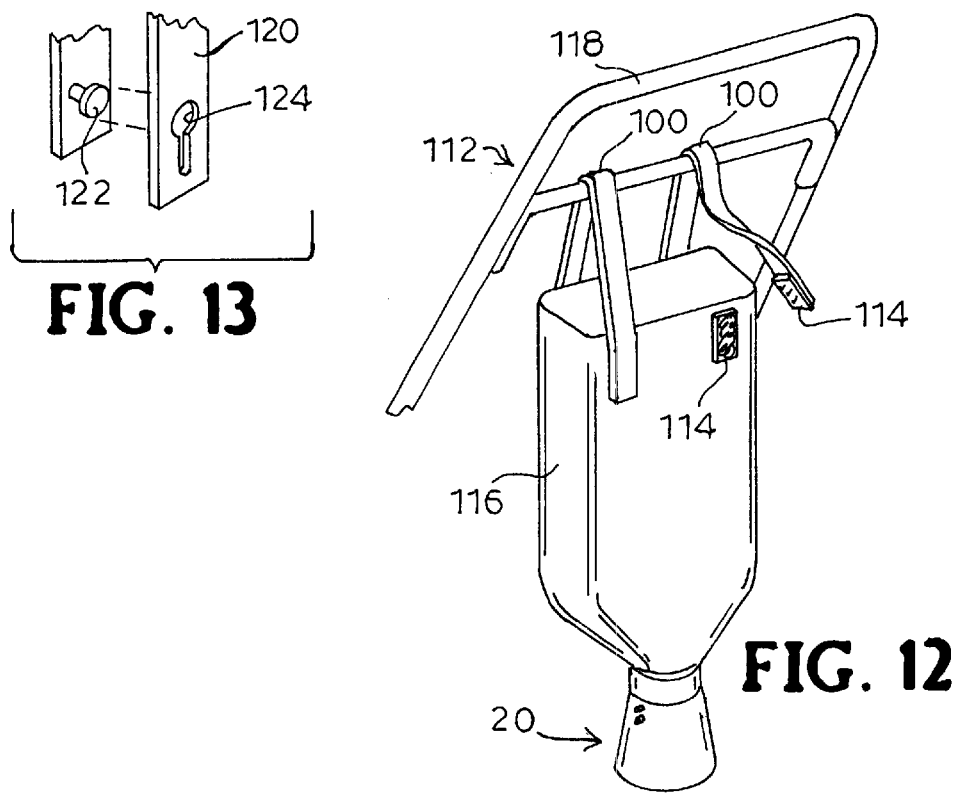
FIG. 12 is a perspective view of a lawn mower handle including means for mounting an embodiment of a particle dispensing apparatus according to the present invention.

Means are provided for mounting the apparatus to the moving object. In one embodiment, the mounting means may comprise adhesive Velcro strips 114. As seen in FIG. 11, the Velcro strips 114 are fixed to the tractor 110 frame and to a conventional container 116 of particles such as, for example, pesticide pellets. The threaded 31 top portion 24 of the housing 22 is adapted to receive the threaded top of the container 116. The container 116 is then attached to the tractor 110. An arrangement for suspending the particle dispensing apparatus 20 and container from the handle 118 of the lawn mower 112 using Velcro strips 114 on straps 120 is shown in FIG. 12. It is understood that the mounting means may be embodied in a number of ways so as to secure the apparatus 20 to the moving mechanism, including fasteners such as bolts. For example, a pin 122 and slot 124 arrangement for use with straps 120 is shown in FIG. 12.

As the tractor 110, lawn mower 112 or other moving object moves along, the vibration and movement generates movement of the pendulum 40 in the dispensing apparatus 20 resulting in discharge of particles 58 to the ground. When used in combination with the lawn mower 112, particles such as insecticides, fungicides, fertilizer, seed, weed killer and the like, will be dispensed over the lawn at the same time as the grass is being cut.

Although the present invention has been shown and described in considerable detail with respect to only a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, the dispensing apparatus may be attached to any moving or vibrating object, including a person's belt, as long as the movement is sufficient to generate motion of the pendulum. Accordingly, I intend to cover all such modifications, omissions, additions and equivalents as may be included within the spirit and scope of the invention as defined by the following claims. In the claims, means-plus-function clauses are intended to cover the structures described herein as performing the recited function, and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

I claim:

1. An apparatus for dispensing particles, comprising:

a housing including upstanding side walls and a boundary wall spanning the opening defined by the side walls for dividing the interior of the housing into an upper portion and a lower portion, the boundary wall and upstanding side walls of the upper portion of the housing defining a cavity for holding the particles, the dividing wall having an opening for allowing one or more particles to pass from the cavity to the lower portion of the housing;

a rotating discharge element disposed in the housing below and adjacent to the opening in the dividing boundary wall, the discharge element adapted to move particles through the opening and into the lower portion of the housing upon rotary actuation of the discharge element;

a pendulum rotatably mounted in the lower portion of the housing; and a ratchet mechanism operably linking the pendulum and the discharge element for causing rotation of the discharge element and dispensing particles from the housing in response to movement of the pendulum.

2. A particle dispensing apparatus as recited in claim 1, wherein the upper portion of the housing is adapted to be connected to a source of particles.

3. A particle dispensing apparatus as recited in claim 1, wherein the walls of the lower portion of the housing extend downwardly beyond the free end of the pendulum.

4. A particle dispensing apparatus as recited in claim 1, wherein the pendulum comprises a shaft journaled in the side walls of the lower portion of the housing, a sleeve having an axial opening for receiving the shaft so that the sleeve is free to rotate about the shaft, and a depending rigid body pivotally connected to the sleeve for swinging movement in an arc parallel to the longitudinal axis of the sleeve.

5. A particle dispensing apparatus as recited in claim 4, wherein the ratchet mechanism comprises a pawl fixed to the body, the pawl engaging ratchet teeth formed on the discharge element for rotating the discharge element upon swinging of the pendulum in one direction, and means for restricting rotation of the discharge element to one direction.

6. A particle dispensing apparatus as recited in claim 4, wherein the portion of the body connected to the sleeve is bifurcated and further comprising a ratchet wheel associated with each arm of the bifurcated body, each ratchet wheel rotatably connected to the body for rotation in only one direction which is opposite to the other ratchet wheel, a gear rotatably mounted on the shaft, the gear meshing with the ratchet wheels on the arms of the pendulum so that swinging movement of the pendulum in an arc parallel to the longitudinal axis of the shaft, and in at least one direction in arc perpendicular to the longitudinal axis of the shaft, imparts movement to the gear, a second shaft journaled in the side walls of the lower portion of the housing, the discharge element mounted on the second shaft for rotation with the second shaft, a plurality of gear wheels on each of the first shaft and second shaft, and means for moving the gear wheels on at least one of the first shaft or the second shaft relative to the other for aligning a gear on the second sleeve with a gear on the second shaft for selectively adjusting the gear ratio.

7. A particle dispensing apparatus as recited in claim 1, wherein the pendulum comprises a shaft journaled in the side walls of the lower portion of the housing, a sleeve having an axial opening for receiving the shaft so that the sleeve is free to rotate about the shaft, and a depending rigid body connected to the sleeve for swinging movement with the sleeve in an arc perpendicular to the longitudinal axis of the sleeve.

8. A particle dispensing apparatus as recited in claim 7, further comprising a second shaft journaled in the walls of the lower portion of the housing, the discharge element mounted on the second shaft for rotation with the second shaft, and wherein the ratchet mechanism comprises a ratchet wheel keyed to the first shaft, a pawl fixed to the body and engaging the ratchet wheel for rotating the ratchet wheel upon swinging of the pendulum in one direction, a gear keyed to the second shaft and operably connected with the ratchet wheel for rotation with the ratchet wheel, and a second pawl for allowing rotation of either the ratchet wheel or gear in one direction only.

9. An apparatus for dispensing particles, comprising:

a housing including upstanding side walls and a boundary wall spanning the opening defined by the side walls for dividing the interior of the housing into an upper portion and a lower portion, the boundary wall and upstanding side walls of the upper portion of the housing defining a cavity for holding the particles, the dividing wall having an opening for allowing one or more particles to pass from the cavity to the lower portion of the housing;

a rotating discharge element disposed in the housing below and adjacent to the opening in the dividing boundary wall, the discharge element adapted to move particles through the opening and into the lower portion of the housing upon rotary actuation of the discharge element;

a pendulum rotatably mounted in the lower portion of the housing, the pendulum comprising a first shaft journaled in the side walls of the lower portion of the housing, a sleeve having an axial opening for receiving the shaft so that the sleeve is free to rotate about the shaft, a depending rigid body pivotally connected to the sleeve for swinging movement in an arc parallel to the longitudinal axis of the sleeve wherein the portion of the body connected to the sleeve is bifurcated, and a ratchet wheel associated with each arm of the bifurcated body, each ratchet wheel rotatably connected to the body for rotation in only one direction which is opposite to the other ratchet wheel;

a first gear rotatably mounted on the first shaft, the first gear meshing with the ratchet wheels on the arms of the pendulum so that swinging movement of the pendulum in an arc parallel to the longitudinal axis of the sleeve and in at least one direction of an arc perpendicular to the longitudinal axis of the sleeve imparts rotation to the gear;

a ratchet wheel rotatably mounted on the pendulum sleeve for rotation with the pendulum sleeve in only one direction when the pendulum moves in the other direction in the arc perpendicular to the longitudinal axis of the sleeve;

a driven gear rotatably mounted in the housing, the first gear and the ratchet wheel meshing with the driven gear for imparting movement to the driven gear;

a second shaft journaled in the walls of the lower portion of the housing, the discharge element mounted on the second shaft for rotation with the second shaft; and means operably linking the driven gear and the second shaft for causing rotation of the second shaft and discharge element and dispensing particles from the housing in response to movement of the pendulum.

10. A particle dispensing apparatus as recited in claim 9, wherein the upper portion of the housing is adapted to be connected to a source of particles.

11. A particle dispensing apparatus as recited in claim 9, wherein the walls of the lower portion of the housing extend downwardly beyond the free end of the pendulum.

12. In combination, a moving object;

a particle dispenser, including a housing including upstanding side walls and a boundary wall spanning the opening defined by the side walls for dividing the interior of the housing into an upper portion and a lower portion, the dividing boundary wall and upstanding side walls of the upper portion of the housing defining a cavity for holding the particles, the dividing wall having an opening for allowing one or more particles to pass from the cavity to the lower portion of the housing, a rotating discharge element disposed in the housing below and adjacent to the opening in the dividing boundary wall, the discharge element adapted to move particles through the opening and into the lower portion of the housing upon rotary actuation of the discharge element, a pendulum rotatably mounted in the lower portion of the housing, and a ratchet mechanism operably linking the pendulum and the discharge element for rotating the discharge element and dispensing particles from the housing in response to movement of the pendulum;

a source of particles connected to the upper portion of the housing for delivery of particles into the cavity; and means for attaching the housing to the moving object, whereby the pendulum swings as a result of being attached to the moving object for discharging particles from the housing.

13. A combination as recited in claim 10, wherein the walls of the lower portion of the housing extend downwardly beyond the free end of the pendulum.

14. A combination as recited in claim 10, wherein the pendulum comprises a shaft journaled in the side walls of the lower portion of the housing, a sleeve having an axial opening for receiving the shaft so that the sleeve is free to rotate about the shaft, and a depending rigid body pivotally connected to the sleeve for swinging movement in an arc parallel to the longitudinal axis of the sleeve.

15. A combination as recited in claim 14, wherein the ratchet mechanism comprises a pawl fixed to the body, the pawl engaging ratchet teeth formed on the discharge element for rotating the discharge element upon swinging of the pendulum in one direction, and means for restricting rotation of the discharge element to one direction.

16. A combination as recited in claim 14, wherein the portion of the body connected to the sleeve is bifurcated and further comprising a ratchet wheel associated with each arm of the bifurcated body, each ratchet wheel rotatably connected to the body for rotation in only one direction which is opposite to the other ratchet wheel, a gear rotatably mounted on the shaft, the gear meshing with the ratchet wheels on the arms of the pendulum so that swinging movement of the pendulum in an arc parallel to the longitudinal axis of the shaft, and in at least one direction in arc perpendicular to the longitudinal axis of the shaft, imparts movement to the gear, a second shaft journaled in the side walls of the lower portion of the housing, the discharge element mounted on the second shaft for rotation with the second shaft, a plurality of gear wheels on each of the first shaft and second shaft, and means for moving the gear wheels on at least one of the first shaft or the second shaft relative to the other for aligning a gear on the second sleeve with a gear on the second shaft for selectively adjusting the gear ratio.

17. A combination as recited in claim 12, wherein the pendulum comprises a shaft journaled in the side walls of the lower portion of the housing, a sleeve having an axial opening for receiving the shaft so that the sleeve is free to rotate about the shaft, and a depending rigid body connected to the sleeve for swinging movement with the sleeve in an arc perpendicular to the longitudinal axis of the sleeve.

18. A particle dispensing apparatus as recited in claim 17, further comprising a second shaft journaled in the walls of the lower portion of the housing, the discharge element mounted on the second shaft for rotation with the second shaft, and wherein the ratchet mechanism comprises a ratchet wheel keyed to the first shaft, a pawl fixed to the body and engaging the ratchet wheel for rotating the ratchet wheel upon swinging of the pendulum in one direction, a gear keyed to the second shaft and operably connected with the ratchet wheel for rotation with the ratchet wheel, and a second pawl for allowing rotation of either the ratchet wheel or gear in one direction only.

19. In combination, a moving object;

a particle dispenser, including:

a housing including upstanding side walls and a boundary wall spanning the opening defined by the side walls for dividing the interior of the housing into an upper portion and a lower portion, the boundary wall and upstanding side walls of the upper portion of the housing defining a cavity for holding the particles, the dividing wall having an opening for allowing one or more particles to pass from the cavity to the lower portion of the housing;

a rotating discharge element disposed in the housing below and adjacent to the opening in the dividing boundary wall, the discharge element adapted to move particles through the opening and into the lower portion of the housing upon rotary actuation of the discharge element;

a pendulum rotatably mounted in the lower portion of the housing, the pendulum comprising a first shaft journaled in the side walls of the lower portion of the housing, a sleeve having an axial opening for receiving the shaft so that the sleeve is free to rotate about the shaft, a depending rigid body pivotally connected to the sleeve for swinging movement in an arc parallel to the longitudinal axis of the sleeve wherein the portion of the body connected to the sleeve is bifurcated, and a ratchet wheel associated with each arm of the bifurcated body, each ratchet wheel rotatably connected to the body for rotation in only one direction which is opposite to the other ratchet wheel;

a first gear rotatably mounted on the first shaft, the first gear meshing with the ratchet wheels on the arms of the pendulum so that swinging movement of the pendulum in an arc parallel to the longitudinal axis of the sleeve and in at least one direction of an arc perpendicular to the longitudinal axis of the sleeve imparts rotation to the gear;

a ratchet wheel rotatably mounted on the pendulum sleeve for rotation with the pendulum sleeve in only one direction when the pendulum moves in the other direction in the arc perpendicular to the longitudinal axis of the sleeve;

a driven gear rotatably mounted in the housing, the first gear and the ratchet wheel meshing with the driven gear for imparting movement to the driven gear;

a second shaft journaled in the walls of the lower portion of the housing, the discharge element mounted on the second shaft for rotation with the second shaft;

and means operably linking the driven gear and the second shaft for causing rotation of the second shaft and discharge element and dispensing particles from the housing in response to movement of the pendulum;

a source of particles connected to the upper portion of the housing for delivery of particles into the cavity; and means for attaching the housing to the moving object, whereby the pendulum swings as a result of being attached to the moving object for discharging particles from the housing.

20. A combination as recited in claim 19, wherein the walls of the lower portion of the housing extend downwardly beyond the free end of the pendulum.

\* \* \* \* \*